(12) United States Patent
Hayakawa (10) Patent No.: US 8,600,666 B2
(45) Date of Patent: Dec. 3, 2013

(54) MAP DATA CREATING DEVICE, NAVIGATION DEVICE, AND MAP PROCESSING SYSTEM USING THESE DEVICES

(75) Inventor: Fujio Hayakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/503,006

(22) PCT Filed: Jan. 19, 2010

(86) PCT No.: PCT/JP2010/000258
§ 371 (c)(1),
(2), (4) Date: Apr. 19, 2012

(87) PCT Pub. No.: WO2011/089639
PCT Pub. Date: Jul. 28, 2011

(65) Prior Publication Data
US 2012/0215441 A1  Aug. 23, 2012

(51) Int. Cl.
*G01C 21/00* (2006.01)
(52) U.S. Cl.
USPC .......................... 701/433; 701/533
(58) Field of Classification Search
USPC .................. 701/410, 425, 428, 461, 533
See application file for complete search history.

(56) References Cited

U.S. PATENT DOCUMENTS

| 3,589,327 | A | * | 6/1971 | Jacobs | 116/39 |
|---|---|---|---|---|---|
| 5,612,881 | A | * | 3/1997 | Moroto et al. | 701/428 |
| 5,787,383 | A | * | 7/1998 | Moroto et al. | 701/418 |
| 7,755,516 | B2 | * | 7/2010 | Clark et al. | 340/961 |
| 7,953,548 | B2 | * | 5/2011 | Vengroff et al. | 701/425 |
| 8,103,439 | B2 | * | 1/2012 | Onishi et al. | 701/410 |
| 8,271,497 | B2 | * | 9/2012 | Ikenoue | 707/740 |
| 8,306,736 | B2 | * | 11/2012 | Wu | 701/410 |
| 8,374,782 | B2 | * | 2/2013 | Santesson et al. | 701/461 |
| 2008/0275645 | A1 | | 11/2008 | Hoshino | |
| 2008/0288166 | A1 | * | 11/2008 | Onishi et al. | 701/209 |
| 2008/0294339 | A1 | * | 11/2008 | Tauchi et al. | 701/212 |
| 2009/0005968 | A1 | * | 1/2009 | Vengroff et al. | 701/202 |
| 2009/0063042 | A1 | * | 3/2009 | Santesson et al. | 701/209 |

(Continued)

FOREIGN PATENT DOCUMENTS

| JP | 7-198401 A | 8/1995 |
|---|---|---|
| JP | 8-233585 A | 9/1996 |

(Continued)

*Primary Examiner* — Helal A Algahaim
(74) *Attorney, Agent, or Firm* — Birch, Stewart, Kolasch & Birch, LLP (57) ABSTRACT

Disclosed is a map data creating device including an average travel speed calculating unit for calculating an average travel speed in each link included in searched route data showing a route which is searched for by a route searching unit according to information which is included in map data acquired from a map database and which is assigned to the link, a control unit for dividing the route which is searched for by the route searching unit into sub-routes according to the average travel speed from the average travel speed calculating unit to acquire map data about a map having a scale according to an average travel speed assigned to each of the sub-routes into which the route is divided from the map database, and a searched route data storage unit for storing the map data acquired by the control unit while bringing the map data into correspondence with the sub-route.

7 Claims, 9 Drawing Sheets

(56) References Cited

U.S. PATENT DOCUMENTS

| | | | | |
|---|---|---|---|---|
| 2010/0004859 | A1* | 1/2010 | Smirnov | 701/209 |
| 2010/0094533 | A1* | 4/2010 | Wu | 701/200 |
| 2010/0250115 | A1* | 9/2010 | Ohata et al. | 701/201 |
| 2011/0137907 | A1* | 6/2011 | Ikenoue | 707/740 |
| 2012/0062779 | A1* | 3/2012 | Sambongi | 348/333.02 |
| 2012/0215441 | A1* | 8/2012 | Hayakawa | 701/428 |

FOREIGN PATENT DOCUMENTS

| | | |
|---|---|---|
| JP | 9-39765 A | 2/1997 |
| JP | 10-222062 A | 8/1998 |
| JP | 2001-74488 A | 3/2001 |
| JP | 2005-55288 A | 3/2005 |
| JP | 2005-321575 A | 11/2005 |
| JP | 2008-216205 A | 9/2008 |

* cited by examiner

| Input Information | | Searched Route |
|---|---|---|
| (1) Place of Departure | JR Tokyo Station Marunouchi Central Exit<br>Departure Date and Time: 9:00 on June 1<br>Means of Transportation: Car<br>Travel Route: Blank, Travel Speed: Blank | (1) Starting Point → (Uchibori Street) (Kokkai-Mae Intersection) (Kasumigaseki Ramp) (Tokyo Metropolitan Expressway Central Circular Route) (Tokyo Metropolitan Expressway No. 3 Shibuya Line) → Tokyo I.C.<br>Travel Speed: 50 km/h<br>(2) Tokyo I.C. → (Tomei Expressway) (Toyoda JCT) (Nagoya I.C.) (Sekigahara I.C.) → Kyoto East I.C.<br>Travel Speed: 90 km/h<br>(3) Kyoto East I.C. → (National Road No. 1) (Kawaramachi Gojo Intersection) (Shichijo Kawaramachi Intersection) (Shichijo Horikawa Intersection) (Hachijo Aburakoji Intersection) → JR Kyoto Station Hachijo Exit<br>Travel Speed: 40 km/h<br>Predicted Travel Time: 5 Hours and 40 Minutes (Place of Departure to Waypoint) |
| (2) Waypoint | JR Kyoto Station<br>Desired Arrival Date and Time: 16:00 on June 1<br>Travel Route: Blank, Travel Speed: Blank | (4) JR Kyoto Station → (Kujo Karasuma Intersection) (Keihan Kokudoguchi Intersection) → Kyoto South I.C.<br>Travel Speed: 30 km/h<br>(5) Kyoto South I.C. → (Meishin Expressway) (Ibaraki I.C.) → Nishinomiya I.C.<br>Travel Speed: 70 km/h |
| (3) Destination | Meriken Park In Kobe City<br>Desired Arrival Date and Time: 19:00 on June 1<br>Travel Route: Blank, Travel Speed: Blank | (6) Nishinomiya I.C. → (National Road No. 43) (National Road No. 2) (Meriken Hatobamae Intersection) → (Arrival Point)<br>Travel Speed: 35 km/h<br>Predicted Travel Time: 1 Hour and 50 Minutes (Waypoint to Destination) |

FIG.4

| Means of Transportation | Travel Speed Range [Scale] | | | | |
|---|---|---|---|---|---|
| | (1) | (2) | (3) | (4) | (5) |
| Car | 20 km/h or Less [1/1,250] | 21 km/h to 40 km/h [1/2,500] | 41 km/h to 60 km/h [1/5,000] | 61 km/h to 80 km/h [1/10,000] | 81 Km or More [1/125,000] |
| Railroad, Subway, and Sea Route | 30 km/h or Less [1/2,500] | 31 km/h to 80 km/h [1/5,000] | 81 km/h to 130 km/h [1/10,000] | 131 km/h to 180 km/h [1/125,000] | 181 km/h or More [1/250,000] |
| Walk and Bicycle | 2 km/h or Less [1/500] | 2.1 km/h to 4 km/h [1/1,000] | 4.1 km/h to 6 km/h [1/1,250] | 6.1 km/h to 10 km/h [1/2,500] | 11 km/h or More [1/3,000] |
| Airplane | 500 km/h or Less [1/250,000] | 501 km/h to 800 km/h [1/500,000] | 801 km/h to 1,200 km/h [1/1,000,000] | 1,201 km/h to 1,800 km/h [1/3,000,000] | 1,801 km/h or More [1/5,000,000] |

FIG.5

| Scheduled Departure Date and Time: 9:00 on June 1 | | Predicted Travel Time: 7 Hours and 30 Minutes |
|---|---|---|
| Sub-Route 1 SR1 | Start Point: N1s (X1s, Y1s)<br>End Point: N1e (X1e, Y1e)<br>Waypoint: N1p1, N1p2, N1p3, ..., N1p5<br>Means of Transportation: Car<br>Travel Speed: 50 km/h<br>Scale: 1/5,000 | Route Network Data<br>Scale Map Data (1/5,000)<br>(Road Attributes : Road Types, Traffic Regulations,<br>Tall Flag, Number of Lanes,<br>Ground Object Attributes : Ground Object Names,<br>Positions, Shapes and Heights,<br>Ground Object Type Marks)<br>Route Guide Data (Intersection Names,<br>Attention Point Data, Map Scale Change Point Data) |
| Sub-Route 2 SR2 | Start Point: N2s (X2s, Y2s)<br>End Point: N2e (X2e, Y2e)<br>Waypoint: N2p1, N2p2, N2p3, ...<br>         (Not Shown)<br>Means of Transportation: Car<br>Travel Speed: 90 km/h<br>Scale: 1/125,000 | Route Network Data<br>Scale Map Data (1/125,000)<br><br>Route Guide Data |
| Sub-Route 3 SR3 | Start Point: N3s (X3s, Y3s)<br>End Point: N3e (X3e, Y3e)<br>End Point Is the Same as<br>Waypoint Nt (Xt1, Yt1)<br>Waypoints: N3p1, N3p2, ..., N3p6<br>Means of Transportation: Car<br>Travel Speed: 40 km/h<br>Scale: 1/2,500 | Route Network Data<br><br>Scale Map Data (1/2,500)<br><br>Ground Object Names, Positions, Shapes and Heights,<br>Ground Object Type Marks |
| Sub-Route 4 SR4 | Start Point: N4s (X4s, Y4s)<br>End Point: N4e (X4e, Y4e)<br>Waypoints: N4p1, N4p2, ..., N4p4<br>Start Point Is Same as<br>Waypoint Nt (Xt1, Yt1)<br>Means of Transportation: Car<br>Travel Speed: 40 km/h<br>Scale: 1/2,500 | Route Network Data<br>Scale Map Data (1/2,500)<br>Route Guide Data |
| Sub-Route 5 SR5 | Start Point: N5s (X5s, Y5s)<br>End Point: N5e (X5e, Y5e)<br>Waypoint: N5p1, N5p2, ...(Not Shown)<br>Means of Transportation: Car<br>Travel Speed: 70 km/h<br>Scale: 1/10,000 | Route Network Data<br>Scale Map Data (1/10,000)<br>Route Guide Data |
| Sub-Route 6 SR6 | Start Point: N6s (X6s, Y6s)<br>End Point (Arrival Place): N6e(X6e, Y6e)<br>Means of Transportation: Car<br>Travel Speed: 35 km/h<br>Scale: 1/2,500 | Route Network Data<br>Scale Map Data (1/2,500)<br>Route Guide Data |

| Input Information A | Input Information B | Sub-Routes of Searched Route A | Sub-Routes of Searched Route B | Relationship Between Sub-Routes |
|---|---|---|---|---|
| User:<br>A-san@xxxx.ne.jp<br>(1) Place of Departure<br>JR Tokyo Station Marunouchi Central Exit<br>Departure Date and Time:<br>9:00 on June 1<br>Means of Transportation: Car<br>Travel Route: Blank<br>Travel Speed: Blank | User:<br>B-san@xxxx.ne.jp<br>(1) Place of Departure<br>JR Tokyo Station Marunouchi Central Exit<br>Departure Date and Time:<br>13:00 on June 1<br>Means of Transportation: JR<br>Travel Route: Blank<br>Travel Speed: Blank | User: A-san@xxxx.ne.jp<br>SR1: Starting Point → (Uchibori Street) (Kokkai-Mae Intersection) (Kasumigaseki Ramp) (Tokyo Metropolitan Expressway Central Circular Route) (Tokyo Metropolitan Expressway No. 3 Shibuya Line) → Tokyo I.C.<br>Travel Speed: 50 km/h<br>SR2: Tokyo I.C. → (Tomei Expressway) (Toyoda JCT) (Nagoya I.C.) (Sekigahara I.C.) → Kyoto East I.C.<br>Travel Speed: 90 km/h<br>SR3: Kyoto East I.C. → (National Road No. 1) (Kawaramachi Gojo Intersection) (Shichijo Kawaramachi Intersection) (Shichijo Horikawa Intersection) (Hachijo Aburakoji Intersection) → JR Kyoto Station Hachijo Exit<br>Travel Speed: 40 km/h<br>Predicted Travel Time: 5 Hours and 40 Minutes<br>(Place of Departure to Waypoint) | User: B-san@xxxx.ne.jp<br>SR1: Starting Point → (Shinkansen Nozomi Leaving at 13:10) (Shin-Yokohama) (Nagoya) → JR Kyoto Station (Arriving at 15:28)<br>Predicted Travel Time: 2 Hours and 18 Minutes<br>Travel Speed: 223 km/h<br>Ticket: 7,980 Yen<br>Reserved: 5,540 Yen | SR1 of A ≠ SR1 of B<br>SR2 of A ≠ SR1 of B<br>SR3 of A ≠ SR1 of B<br>User Can Transfer from Route A to Route B |
| (2) Waypoint<br>JR Kyoto Station<br>Desired Arrival Date and Time:<br>16:00 on June 1<br>Travel Route: Blank<br>Travel Speed: Blank | (2) Waypoint<br>JR Kyoto Station<br>Desired Arrival Date and Time:<br>16:00 on June 1<br>Means of Transportation: Car<br>Travel Route: Blank<br>Travel Speed: Blank | SR4: JR Kyoto Station → (Kujo Karasuma Intersection) (Keihan Kokudoguchi Intersection) → Kyoto South I.C.<br>Travel Speed: 30 km/h<br>SR5: Kyoto South I.C. → (Meishin Expressway) (Ibaraki I.C.) → Nishinomiya I.C.<br>Travel Speed: 70 km/h | SR2: JR Kyoto Station → (Kujo Karasuma Intersection) (Keihan Kokudoguchi Intersection) → Kyoto South I.C.<br>Travel Speed: 30 km/h<br>SR3: Kyoto South I.C. → (Meishin Expressway) (Ibaraki I.C.) → Nishinomiya I.C.<br>Travel Speed: 70 km/h | SR4 of A = SR2 of B<br>SR5 of A = SR3 of B<br>User Can Transfer from Route A to Route B and Vice Versa |
| (3) Destination<br>Meriken Park in Kobe City<br>Desired Arrival Date and Time:<br>19:00 on June 1<br>Travel Route: Blank<br>Travel Speed: Blank | (3) Waypoint<br>Meriken Park In Kobe City<br>Desired Arrival Date and Time:<br>19:00 on June 1<br>Means of Transportation: Car<br>Travel Route: Blank<br>Travel Speed: Blank | SR6: Nishinomiya I.C. → (National Road No. 43) (National Road No. 2) (Meriken Hatobamae Intersection) → (Arrival Point)<br>Travel Speed: 35 km/h<br>Predicted Travel Time: 1 Hour and 50 Minutes<br>(Waypoint to Destination) | SR4: Nishinomiya I.C. → (National Road No. 43) (National Road No. 2) (Meriken Hatobamae Intersection) → Meriken Park in Kobe City<br>Travel Speed: 35 km/h<br>Predicted Travel Time: 1 Hour and 50 Minutes (Waypoint to Destination) | SR6 of A = SR4 of B<br>User Can Transfer from Route A to Route B and Vice Versa |
| | (4) Destination<br>Takamatsu Harbor<br>Arrival Desired Date: 6:00 on June 2<br>Means of Transportation: Ferry<br>Travel Route: Kobe to Takamatsu<br>Travel Speed: 35 km/h | | SR5: Kobe Harbor → (Ferry Leaving at 00:55) → Takamatsu Harbor (Arriving at 5:00)<br>Travel Speed: 25 km/h<br>Predicted Travel Time: 4 Hours and 55 Minutes<br>Boat Ticket: 1,800 Yen | No Route of A |

FIG.11

| Relationship Concerning Position Information about Route | Relationship Concerning Time Information of an Overlapping Point on the Routes | | |
|---|---|---|---|
| (Representation Expression) | User Passes through a Point on the Route A Previously (A < B) | User Passes through a Point on the Route A Later (A > B) | Users Pass through a Point at Much the Same Time (A*B) |
| Routes Having the Same Position Coordinates and the Same Direction (A=B) | User Can Transfer from the Route A to the Route B | User Can Transfer from the Route B to the Route A | User Can Transfer from the Route A to the Route B and Vice Versa |
| Routes Having the Same Position Coordinates and Opposite Directions (A=−B) | User Cannot Transfer to the Other Route | User Cannot Transfer to the Other Route | Point Where User Can Transfer from One Route to the Other Route Exists |
| Different Routes (A≠B) | User Cannot Transfer to the Other Route | User Cannot Transfer to the Other Route | User Cannot Transfer to the Other Route |
| When There Is at Least One Overlapping Point on the Routes (A*B) | User Can Transfer from the Route A to the Route B | User Can Transfer from the Route B to the Route A | User Can Transfer from the Route A to the Route B and Vice Versa |

MAP DATA CREATING DEVICE, NAVIGATION DEVICE, AND MAP PROCESSING SYSTEM USING THESE DEVICES

FIELD OF THE INVENTION

The present invention relates to a map data creating device, a navigation device, and a map processing system using these devices. More particularly, it relates to a technique of reducing the amount of map data which is used when a moving object in which the navigation device is mounted travels.

BACKGROUND OF THE INVENTION

In a map database which a map processing system which is represented by, for example, a navigation device has, a plurality of types of map data having different scales, such as $1/2,500$, $1/25,000$, and $1/50,000$, are stored. A navigation device mounted in a moving object selects a scale for a map to be displayed according to the travel speed of the moving object except when the user selects a scale for the map by using an operation button or a touch panel. More specifically, the navigation device detects the travel speed of the moving object, and, when this detected travel speed is equal to or lower than a predetermined speed A, selects a map scale X, when the travel speed is higher than the predetermined speed A and equal to or lower than a predetermined speed B, selects a map scale Y, or when the travel speed is higher than the predetermined speed B, selects a map scale Z. The navigation device then acquires map data for displaying the map having the selected scale from a map database, and creates display data according to this map data. This created display data is converted into a video signal, and this video signal is sent to a display unit. As a result, the map having the scale according to the travel speed is displayed on the screen of the display unit.

As an example of such a map processing system, patent reference 1 discloses a navigation device which displays a map of a surrounding area with a scale corresponding to the travel speed of a moving object. In this navigation device, a selecting means selects a map scale corresponding to the travel speed of the moving object which is detected by a speed detecting means, and an arithmetic processing means creates display data about a map image of an area surrounding the position of the moving object detected by a position detecting means with the scale selected by the selecting means on the basis of map data read from a map data storage means. A display control means reads the display data stored in a memory, converts the display data into a video signal, and causes a display means to display a map.

RELATED ART DOCUMENT

Patent reference

Patent reference 1: Japanese Unexamined Patent Application Publication No. Hei 10-222062

SUMMARY OF THE INVENTION

The above-mentioned first conventional navigation device needs to store map data about maps having three different scales in order to switch among the three different map scales and selectively display one of them. Therefore, a problem is that even when a travel speed is specified for the route, it is necessary to store the map data about maps having three different scales, and the amount of map data increases.

The present invention is made in order to solve the above-mentioned problem, and it is therefore an object of the present invention to provide a map data creating device and a navigation device which can provide a map and route information for a user with a small amount of data, and a map processing system using these devices.

In accordance with the present invention, there is provided a map data creating device including: a map database for storing map data; a route searching unit for searching for a route leading from a place of departure to a destination; an average travel speed calculating unit for calculating an average travel speed in each link included in searched route data showing the route which is searched for by the route searching unit according to information which is included in map data acquired from the map database and which is assigned to the link; a control unit for dividing the route which is searched for by the route searching unit into sub-routes according to the average travel speed from the average travel speed calculating unit to acquire map data about a map having a scale according to an average travel speed assigned to each of the sub-routes into which the route is divided from the map database; and a searched route data storage unit for storing the map data acquired by the control unit while bringing the map data into correspondence with the sub-route.

Because the map data creating device in accordance with the present invention is constructed in such a way as to extract map data about maps having different scales from the map database according to the route and the travel speeds at which the moving object is expected to travel along the route, and store the map data while bringing the map data into correspondence with sub-routes, the map data creating device can store the planned route-to-be-travelled and the map data with a small amount of data. Further, the map data creating device makes it easy for the user to store the map data in a storage medium, such as a USB memory or an SD card, and to carry this storage medium.

BRIEF DESCRIPTION OF THE FIGURES

FIG. 3 is an explanatory drawing for explaining the operation of the map data creating device in accordance with Embodiment 1 of the present invention;

FIG. 5 is a view showing an example of sub-routes in the map data creating device in accordance with Embodiment 1 of the present invention, and the structure of data in which information about the sub-routes is stored;

FIG. 10 is a view showing an example of use of the map data creating device in accordance with Embodiment 1 of the present invention.

EMBODIMENTS OF THE INVENTION

Figure 1:
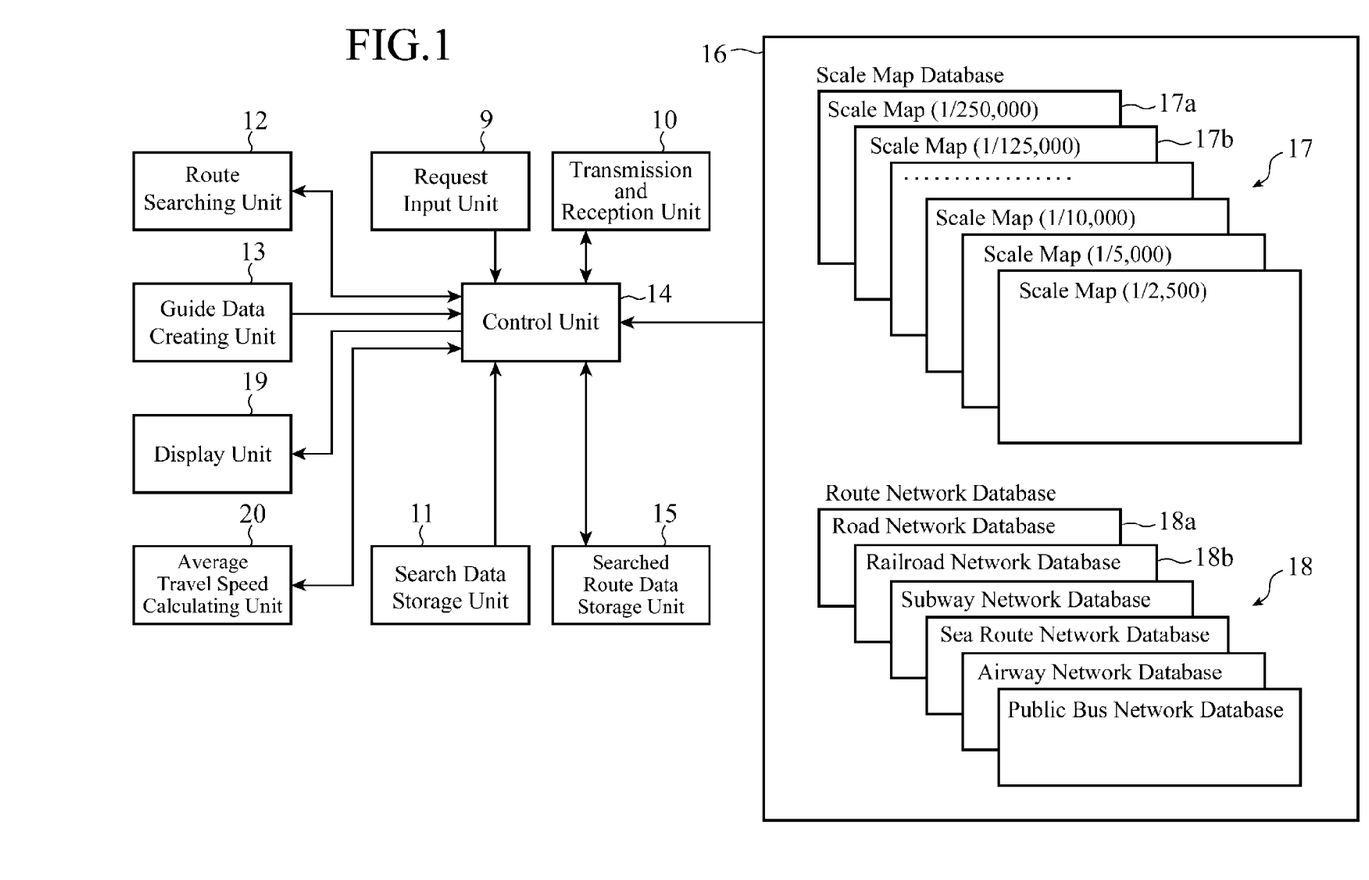
FIG. 1 is a block diagram showing the structure of a map data creating device in accordance with Embodiment 1 of the present invention.

Hereafter, the preferred embodiments of the present invention will be explained in detail with reference to the drawings.
Embodiment 1
FIG. 1 is a block diagram showing the structure of a map data creating device in accordance with Embodiment 1 of the present invention. This map data creating device consists of, for example, a map server. This map data creating device is provided with a request input unit 9, a transmission and reception unit 10, a search data storage unit 11, a route searching unit 12, a guide data creating unit 13, a control unit 14, a searched route data storage unit 15, a map database 16, a display unit 19, and an average travel speed calculating unit 20.

The request input unit 9 is comprised of, for example, a keyboard equipped with input keys, such as an operation button, alphanumeric character buttons, and kana character buttons. The request input unit is used in order for a user to input his or her request or operation to the map data creating device. Data inputted from this request input unit 9 is sent to the control unit 14. The request input unit 9 can alternatively be comprised of a voice recognition device which recognizes an uttered voice.

The transmission and reception unit 10 communicates, via a network (not shown), such as the Internet or a LAN, with a vehicle-mounted navigation device, a mobile terminal or the like. For example, in response to a request, this transmission and reception unit 10 transmits data which is read from the map database 16 or the searched route data storage unit 15 and is then sent thereto via the control unit 14 to a vehicle-mounted navigation device, a mobile terminal or the like.

The search data storage unit 11 stores search data used for performing an address search or a facility search according to information inputted by the user. The search data stored in this search data storage unit 11 is read by the control unit 14.

The route searching unit 12 searches for an optimal route which leads from a place of departure to a destination and which matches the user's request by using a Dijkstra method or the like. Searched route data showing the route which is searched for by this route searching unit 12 is sent, via the control unit 14, to the searched route data storage unit 15, and is stored in the searched route data storage unit 15. The guide data creating unit 13 creates intersection information about an intersection at which the user should change the driving direction, traffic restriction information or the like, and sends this information to the control unit 14 as guide data.

The control unit 14 transmits and receives data to and from the request input unit 9, the transmission and reception unit 10, the search data storage unit 11, the route searching unit 12, the guide data creating unit 13, the searched route data storage unit 15, the map database 16, the display unit 19, and the average travel speed calculating unit 20, and controls the whole of this map data creating device. The details of this control unit 14 will be mentioned below.

The searched route data storage unit 15 stores the searched route data sent thereto, via the control unit 14, from the route searching unit 12, and map data associated with the route shown by this searched route data. The contents stored in this searched route data storage unit 15 are read by the control unit 14.

The map database 16 includes a scale map database 17 and a route network database 18. The scale map database 17 stores a plurality of scale maps 17a, 17b, and . . . having different scales. Further, the route network database 18 stores subway network data, sea route network data, air route network data, public bus network data, etc. in addition to road network data 18a, such as data about highways, national roads, prefectural roads and municipal roads, or data about urban areas, and railroad network data 18b, such as data about JR and local railways.

The road network data 18 a are hierarchically organized according to the level of detail of the road network. The road network which covers the whole of a country is divided into some areas, and each road in each area is shown by nodes showing points on the road, links each showing a part of the road, and a link sequence showing a sequence of roads. To each link, a travel speed at which a moving object is expected to pass through the link is assigned. A travel speed is assigned to each link according to the number of lanes of the link and actual results data about the degree of crowdedness of the link which are acquired from the number of traveling vehicles which passed through the link in such away the travel speed does not exceed a restriction speed, e.g. 90 km/h in the case of a highway, or 70 km/h in the case of an expressway.

The display unit 19 displays various pieces of information according to display data sent thereto from the control unit 14. The average travel speed calculating unit 20 calculates an average travel speed from both the travel distance on each of links extending in turn from the place of departure of the route shown by the searched route data sent thereto, via the control unit 14, from the searched route data storage unit 15, and the travel speed assigned to each of the links. The average travel speed calculated by this average travel speed calculating unit 20 is notified to the control unit 14.

Next, an operation of extracting maps having scales according to travel speeds assigned to a route from the map database 16, the operation being carried out by the map data creating device in accordance with Embodiment 1 of the present invention constructed as mentioned above, will be explained with reference to a flow chart shown in FIG. 2 and an explanatory drawing shown in FIG. 3.

Figure 2:
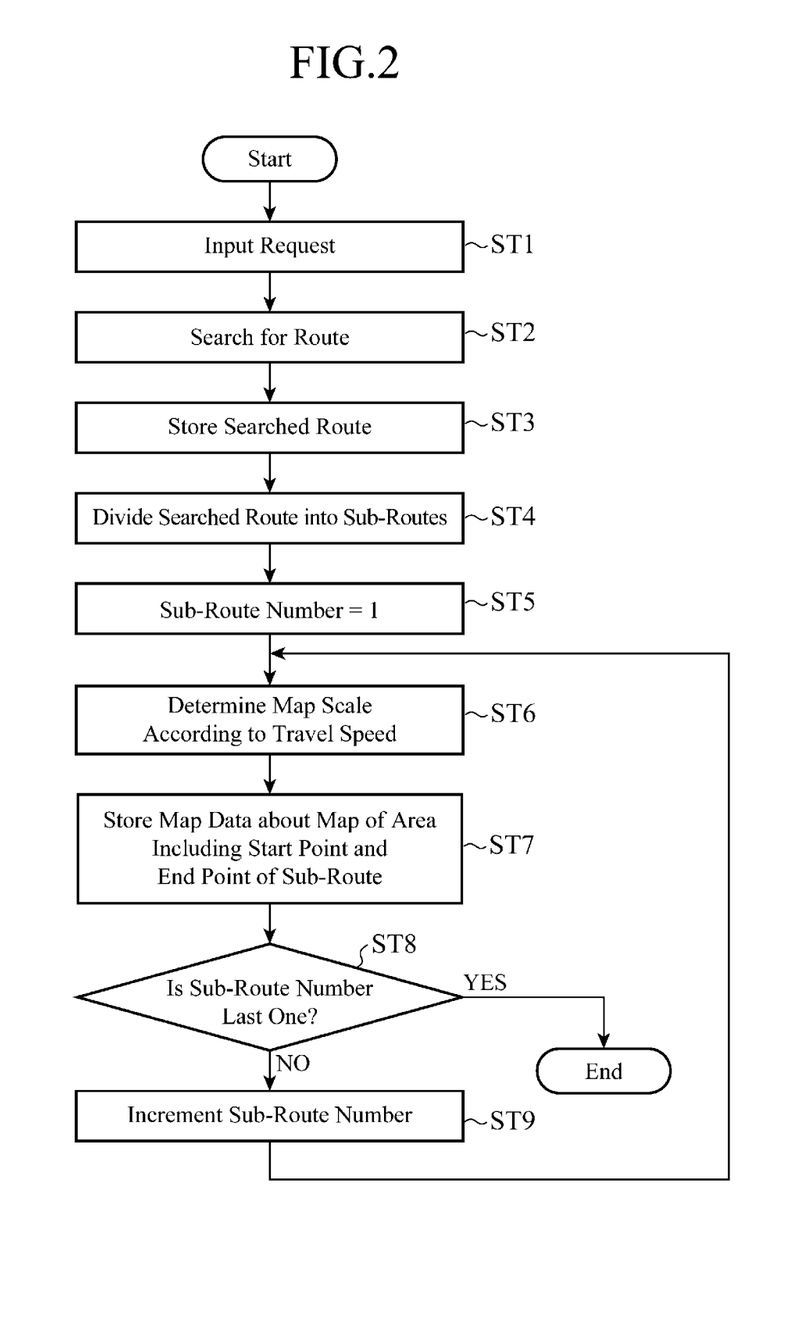
FIG. 2 is a flow chart showing the operation of the map data creating device in accordance with Embodiment 1 of the present invention.

When the operation is performed according to the flow chart shown in FIG. 2, information about maps having scales associated with travel speeds at which the user is going to travel along the route is extracted from the map database 16 according to the user's input of travel information, and is stored in the searched route data storage unit 15. FIG. 3 shows an example of the input information inputted by the user, and search information which the route searching unit 12 provides for the user after searching for the route, and the input information is shown in a left column of FIG. 3, and the search information (the searched route) is shown in a right column.

First, a request input is performed (step ST1). More specifically, the user inputs information about a trip which the user is going to start from now on, i.e. the place of departure, the departure date and time, the destination, and the types of means of transportation from the request input unit 9. In this case, when the user is going to go via waypoints, the user inputs these waypoints, the order in which the user will reach the waypoints, and a means of transportation between any two of the waypoints. FIG. 3 shows an example of the input in a case in which the user departs from a starting point (the Marunouchi central exit of the JR Tokyo Station) by car at the departure date and time: 9:00 on June 1, goes via the JR Kyoto Station, and moves to the Meriken Park in Kobe city.

Although the user can also specify a travel route and a travel speed in this travel route, these fields are blank in this example. In the case in which the fields are blank, a higher priority is given to the travel speed assigned to each link which constructs the road network. When a travel route and a travel speed are inputted by the user, the route searching unit 12 gives a higher priority to the travel route and the travel speed which are inputted by the user to search for a route.

When a request input is performed in above-mentioned step ST1, i.e., when input information as shown in FIG. 3 is inputted, a route search is then made (step ST2). More specifically, the route searching unit 12 searches through the road network data 18 a stored in the map database 16 (through other railroad network data 18b, subway network data 18c or the like when the means of transportation is changed), for an optimal route, and provides information showing the searched route for the user.

The information showing the searched route is shown in a right column of FIG. 3. The searched route shown in FIG. 3 departs from the starting point, and, after that, goes via the Tokyo metropolitan expressway, the Tomei expressway, etc., exits the expressway at the Kyoto East I.C., and arrives at the JR Kyoto Station. Then, after departing from the JR Kyoto Station, the route enters the Meishin Expressway from the Kyoto South I.C. and goes via this expressway, exits the expressway at the Nishinomiya I.C., goes via the National road No. 43 and the National road No. 2, and then arrives at the Meriken Park which is the destination.

The searched route acquired through the route search in step ST2 is then stored (step ST3). More specifically, the route which the route searching unit 12 has searched for is stored in the searched route data storage unit 15 via the control unit 14.

A process of dividing the route into sub-routes is then carried out (step ST4). More specifically, the average travel speed calculating unit 20 calculates an average travel speed from both the travel distance on each of links extending in turn from the place of departure of the route which is stored, in step ST3, in the searched route data storage unit 15, and the travel speed assigned to each of the links, and notifies the average travel speed to the control unit 14. When the average travel speed notified thereto from the average travel speed calculating unit 20 falls within a predetermined speed range, the control unit 14 includes the link currently being processed thereby in the same section as the immediately preceding link, whereas when the average travel speed notified thereto varies without falling within the speed range, the control unit includes the link currently being processed thereby in another section. When including the link currently being processed thereby in another section, the average travel speed calculating unit calculates an average travel speed from the travel distance on each link extending in turn from the start point of the other section, and the travel speed assigned to the link which is assumed to be included in the other section.

Hereafter, the process of dividing the route into sections is carried out in the same way while an average travel speed is calculated for each section. The divided sections are expressed as a sub-route 1, a sub-route 2, and . . . in the order of increasing distance from the place of departure. The searched route is thus divided into sub-routes according to their respective average travel speeds.

In the example shown in FIG. 3, the searched route consists of six sub-routes: a sub-route 1 extending from the starting point to the Tokyo I.C., a sub-route 2 extending from the Tokyo I.C. to the Kyoto East I.C., a sub-route 3 extending from the Kyoto East I.C. to the JR Kyoto Station, a sub-route 4 extending from the JR Kyoto Station to the Kyoto South I.C., a sub-route 5 extending from the Kyoto South I.C. to the Nishinomiya I.C., and a sub-route 6 extending from the Nishinomiya I.C. to the arrival point.

The predicted travel time from the place of departure to the waypoint is 5 hours and 40 minutes, and the predicted travel time from the waypoint to the destination (arrival place) is 1 hour and 50 minutes. The searched route is the one via which the user will arrive at the destination before the user's desired arrival date and time. As shown in the right column of FIG. 3, the travel speed assigned to the sub-route 1 is 50 km/h, the travel speed assigned to the sub-route 2 is 90 km/h, the travel speed assigned to the sub-route 3 is 40 km/h, the travel speed assigned to the sub-route 4 is 30 km/h, the travel speed assigned to the sub-route 5 is 70 km/h, and the travel speed assigned to the sub-route 6 is 35 km/h. When the user refers to the result of the route search and then judges that the result is not his or her desired route, the user can change the input information to cause the navigation device to make a route search again.

A sub-route number is then initialized to "1" (step ST5). More specifically, the control unit 14 sets an initial value of the sub-route number which is given to the sub-route about which data to read from the searched route data storage unit 15 to "1".

A map scale is then determined according to the travel speed assigned to the sub-route (step ST6). More specifically, the control unit 14 reads the searched route data about the sub-route corresponding to the sub-route number from the searched route data storage unit 15, and determines a travel speed range for the sub-route shown by the read searched route data.

Figure 4:
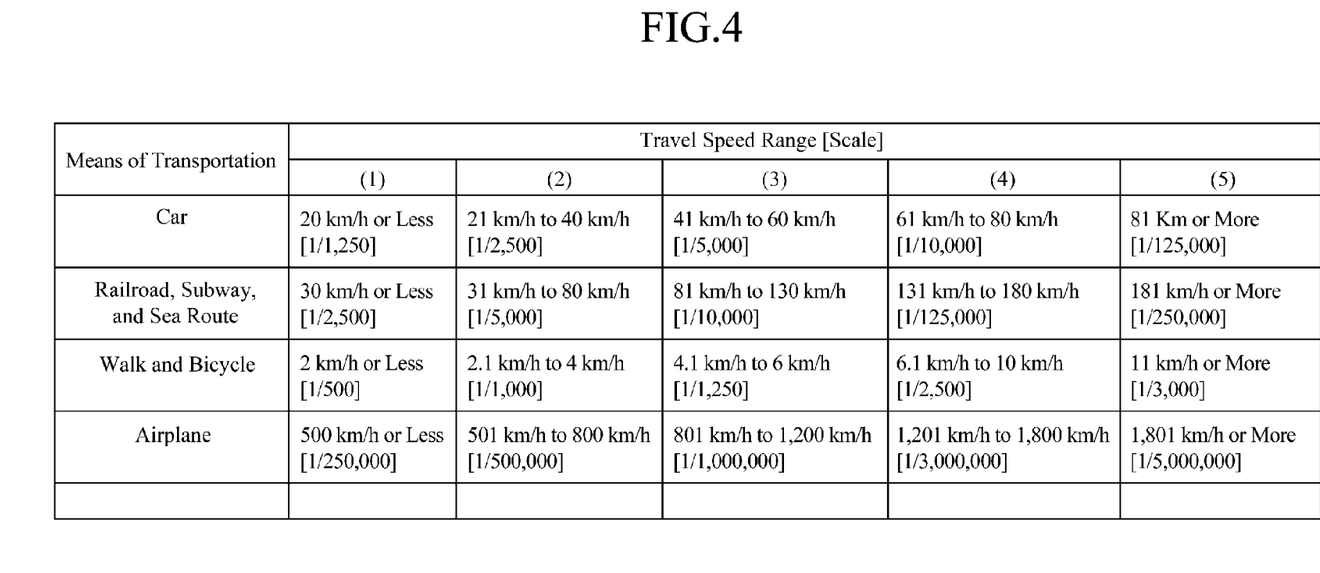
FIG. 4 is a view showing an example of travel speed ranges defined for each means of transportation which are handled by the map data creating device in accordance with Embodiment 1 of the present invention.

FIG. 4 shows an example of travel speed ranges defined for each means of transportation. Travel speeds are brought into correspondence with map scales as follows. More specifically, in the case of traveling by car, a speed lower than 21 km/h is determined as a range (1) associated with a scale of 1/1,250, a speed ranging from 21 km/h to 40 km/h is determined as a range (2) associated with a scale of 1/2,500, a speed ranging from 41 km/h to 60 km/h is determined as a range (3) associated with a scale of 1/5,000, a speed ranging from 61 km/h to 80 km/h is determined as a range (4) associated with a scale of 1/10,000, and a speed equal to or higher than 81 km/h is determined as a range (5) associated with a scale of 1/25,000.

Because the travel speed is 50 km/h in the case of the sub-route 1 shown in FIG. 3, the speed range (3) and the map scale of 1/5,000 are set for the sub-route 1. More specifically, in the case of the sub-route 1, a map having the scale of 1/5,000 and including the start point and the end point of the sub-route 1 (in the example shown in FIG. 3, the JR Tokyo Station and the Tokyo I.C. of the Tomei expressway) is selected.

The map data about the map of an area including the start point and the end point of the sub-route is then stored (step ST7). More specifically, the control unit 14 reads a map having the scale which is determined in step ST6 from the map database 16, and stores the map in the searched route data storage unit 15. For example, when it is determined, in step ST6, that the map scale according to the travel speed is the scale of 1/5,000. The map data about a map having the scale of 1/5,000 is read from the map database 16, and is stored as map data about the sub-route 1 in the searched route data storage unit 15.

FIG. 5 shows the sub-routes and the structure of data in which pieces of information about the sub-routes are stored. The data about the sub-route 1 include the coordinates of the start point, the coordinates of the end point, the coordinates of each waypoint, a means of transportation, a travel speed, a map scale, route network data, scale map data, and route guide data. The scale map data include road attributes and ground object attributes.

The road attributes include the road type of each road (expressway, metropolitan expressway, national road, prefectural road, or municipal road), a traffic regulation on each road, such as one-way traffic, a toll flag, and the number of lanes of each road. Further, the ground object attributes include the name of each ground object, such as a building's name, the position, shape, height, and type of each ground object, and a ground object type mark for identifying the type of industry of each ground object. Further, the route guide data include the name of each intersection, attention point data, and map scale change point data.

Whether or not the sub-route number is the last one is then checked to see (step ST8). More specifically, the control unit 14 checks to see whether the process has been completed on all of the sub-routes into which the entire route is divided in step ST4. When it is determined in this step ST8 that the sub-route number is not the last one, the sub-route number is incremented (step ST9). After that, the navigation device returns the sequence to step ST6 and then repeats the above-mentioned processing.

In contrast, when it is determined that the sub-route number is the last one, the processing is ended. Through the above-mentioned processing, the travel route from the place of departure to the arrival place and the map data are stored in the searched route data storage unit 15. FIG. 5 shows the searched route data created through the above-mentioned processing. That is, the searched route data is the one about the route where the user departs from the JR Tokyo Station which is the place of departure at 9:00 on June 1, and then arrives at the Meriken Park in Kobe city after 7 hours and 30 minutes has elapsed. The route of the trip which the user has inputted is divided into the sub-routes 1 to 6 (SR1 to SR6), and each of the sub-routes includes the positions of the start point, the end point, and each waypoint, a means of transportation, a travel speed, map data about a map having a scale corresponding to the travel speed, and attribute data about roads and ground objects.

Figure 6:
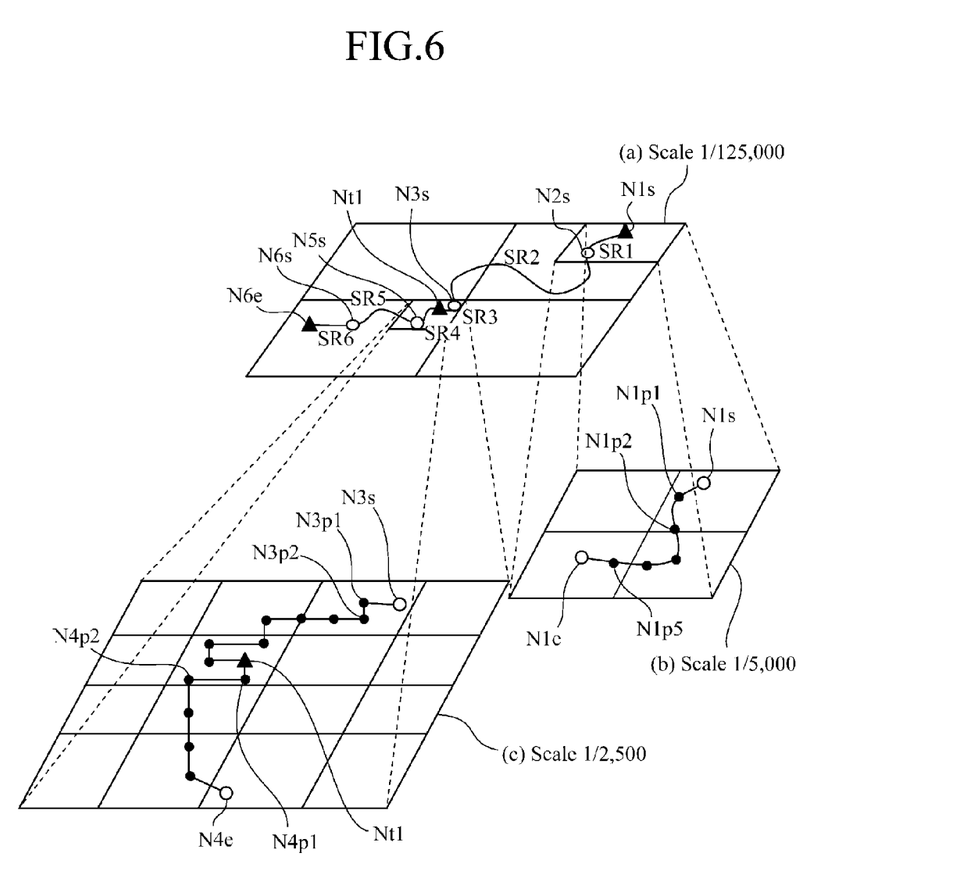
FIG. 6 is a view showing the concept underlying the scale of each map shown by searched route data stored in the map data creating device in accordance with Embodiment 1 of the present invention.

FIG. 6 is a view showing the concept underlying the scale of each map shown by the searched route data stored in the searched route data storage unit 15. (a) of FIG. 6 shows a map having a scale of 1/125,000, N1s shown by a mark ▯£ is the starting point, Nt1 shown by a mark ▲ is a waypoint, and N6e shown by a mark ▲ is the arrival place. SR1, SR2, . . . , and SR6 show the sub-routes, and each mark ○ shows the start point or the end point of a sub-route and shows a delimiter between sub-routes. The map shown in (a) of FIG. 6 has a scale which can show the entire route. For example, the map is the one having a scale of 1/250,000, 1/500,00, or the like.

(b) of FIG. 6 shows a map showing the sub-route 1, and the scale of this map is 1/5,000. N1s is the start point of the sub-route 1 while being the place of departure, N1e is the end point of the sub-route 1, and N1p1 to N1p5 are waypoints. As the sub-route 1, the route leading from the JR Tokyo Station, passing through the Uchibori street and the Kokkai-mae intersection, entering the Central Circular Route of the Tokyo metropolitan expressway from the Kasumigaseki ramp, going via the Shibuya Line of the Tokyo metropolitan expressway No. 3, and then arriving at the Tokyo I.C. is shown with a map having a scale of 1/5,000.

(c) of FIG. 6 shows a map showing the sub-route 3 and the sub-route 4, and the scale of this map is 1/2,500. The sub-route 3 is the route leading from the Kyoto East I.C. to the JR Kyoto Station, and the sub-route 4 is the route leading from the JR Kyoto Station to the Kyoto South I.C.. These routes are shown by the map having a more detailed scale.

In the searched route data storage unit 15, in addition to the above-mentioned map shown in (a) of FIG. 6, the map having a scale of 1/5,000 showing the sub-route 1, a map having a scale of 1/125,000 showing the sub-route 2, the map having a scale of 1/2,500 showing the sub-routes 3 and 4, a map having a scale of 1/10,000 showing the sub-route 5, and a map having a scale of 1/2,500 showing the sub-route 6 are stored.

As compared with the data volume required to display a section of about 600 km along the route leading from the JR Tokyo Station, as the starting point, to the Meriken Park in Kobe city with a map having a scale of 1/125,000, 1/10,000, 1/5,00, or 1/2,500, the data volume held by the map data creating device in accordance with this Embodiment 1 is remarkably small, and therefore there is provided an advantage of enabling the user to easily carry the map data having the data volume with a portable storage medium.

Figure 7:
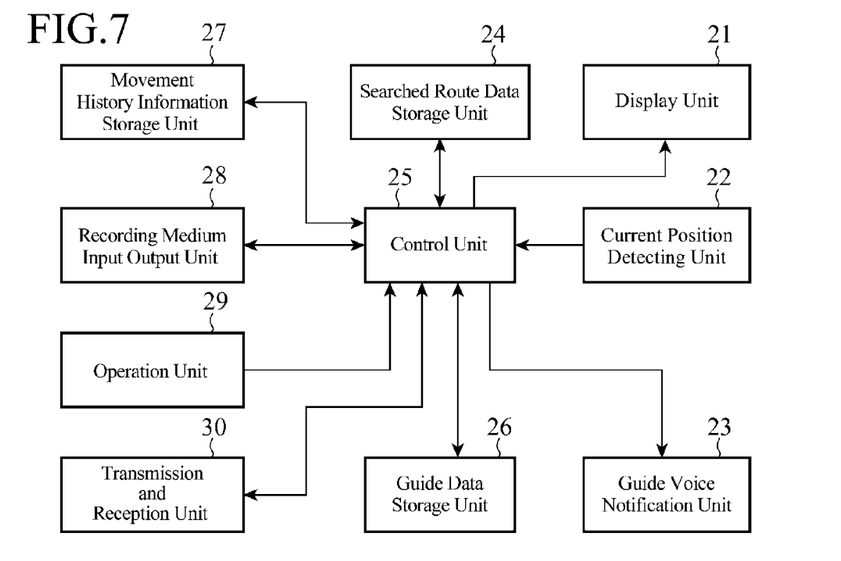
FIG. 7 is a block diagram showing a navigation device which provides guidance by using route search data created by the map data creating device in accordance with Embodiment 1 of the present invention.

FIG. 7 is a block diagram showing a navigation device which provides guidance by using the searched route data created by the map data creating device in accordance with Embodiment 1 of the present invention. This navigation device is provided with a display unit 21, a current position detecting unit 22, a guide voice notification unit 23, a searched route data storage unit 24, a control unit 25, a guide data storage unit 26, a movement history information storage unit 27, a recording medium input output unit 28, an operation unit 29, and a transmission and reception unit 30.

The display unit 21 displays various pieces of information including a map or a route according to display data sent thereto from the control unit 25. The current position detecting unit 22 consists of a GPS (Global Positioning System) receiver, a gyro sensor, a speed sensor, etc., and detects the current position of a moving object. Current position data showing the current position detected in this current position detecting unit 22 is sent to the control unit 25.

The guide voice notification unit 23 outputs route guidance by voice according to voice data sent thereto from the control unit 25. The searched route data storage unit 24 stores searched route data created by the above-mentioned map data creating device therein. This searched route data stored in the searched route data storage unit 24 is read by the control unit 25.

The control unit 25 transmits and receives data to and from the display unit 21, the current position detecting unit 22, the guide voice notification unit 23, the searched route data storage unit 24, the guide data storage unit 26, the movement history information storage unit 27, the recording medium input output unit 28, the operation unit 29, and the transmission and reception unit 30 to control the whole of this navigation device.

The guide data storage unit 26 stores character data and voice data showing route guidance messages. The contents stored in this guide data storage unit 26 are read by the control unit 25. The movement history information storage unit 27 stores time, position information, etc. as historical data as the moving object travels along the route. The contents stored in this movement history information storage unit 27 are read by the control unit 25.

The storage medium input output unit 28 corresponds to an external data acquiring unit in accordance with the present invention. For example, while reading data from a storage medium, such as a USB memory or an SD card, and sending the data to the control unit 25, the storage medium input output unit writes data sent thereto from the control unit 25 in the storage medium. The operation unit 29 is used in order for a user to input information used for operating the navigation device. The data inputted from this operation unit 29 is sent to the control unit 25. The transmission and reception unit 30 transmits data sent thereto from the control unit 25 via a network (not shown) (e.g., a request for destination information or map data) to the map data creating device (map server), and receives map data or the like which is sent thereto and then transmits this data to the control unit 25.

The searched route data which is created by the above-mentioned map data creating device, and is stored in the searched route data storage unit 15 is stored in the searched route data storage unit 24 of the navigation device via the storage medium input output unit 28 by using, for example, a USB memory. As an alternative, the searched route data stored in the searched route data storage unit 15 of the map data creating device can be received by the transmission and reception unit 30 via the network, and can be stored in the searched route data storage unit 24 via the control unit 25. In this case, the transmission and reception unit 30 corresponds to the external data acquiring unit in accordance with the present invention.

Next, the operation of the navigation device constructed as above will be explained. The control unit 25 detects the current position of the moving object according to the current position data acquired from the current position detecting unit 22, and reads map data about a map of an area centered at this detected current position from the searched route data storage unit 24. When the moving object is at the place of departure, a map having a scale of 1/5,000 of an area in the vicinity of the JR Tokyo Station on the sub-route 1 is read. The detected current position of the moving object and the map shown by the searched route data read from the searched route data storage unit 24 are displayed on the display unit 21.

When the moving object starts travelling, the control unit 25 extracts points where the navigation device provides route guidance for the user, such as intersections existing on the route-to-be-traveled shown by the search data read from the searched route data storage unit 24. The extracted points for route guidance, and guide messages and/or guide voices are stored in the guide data storage unit 26.

Next, the control unit calculates the distance between the current position and a point where the navigation device provides route guidance for the user, and determines whether the distance falls within a preset distance range. When it is determined that the distance falls within the preset distance range, a guide message and/or a guide voice is read from the guide data storage unit 26, and is then outputted to the display unit 21 and/or the guide voice notification unit 23. When the moving object is traveling along the sub-route 1 and gets close to an entrance of the Tokyo metropolitan expressway, guidance showing that the user is getting close to an entrance of the Central Circular Route and the user should enter the Shibuya line is provided for the user. When the moving object then gets close to the Tokyo I.C. which is the end point of the sub-route, guidance showing that the user is getting close to an entrance of the Tomei expressway, and the scale of the map displayed will be changed.

When determining that the current position enters the sub-route 2, the control unit 25 reads the map having a scale 1/125,000 from the searched route data storage unit 24, and then displays the map on the display unit 21. In this case, as the current position moves, the control units displays a mark showing the current position on the map displayed on the display unit 21 while moving the map image in such a way that the current position mark is centered at the map, and, when a point for route guidance gets close to within the predetermined distance range from the current position, outputs a guide message and/or a guide voice. Further, the time that the control unit 25 displays the map can be, for example, five minutes before the moving object reaches the start point of the sub-route 2. As an alternative, on a distance basis at the time of travelling at a speed of 50 km/h, the time that the control unit 25 displays the map can be the one that the moving object reaches a point at a distance of 4.2 km from the start point of the sub-route 2. In the case in which the control unit is constructed in such a way as to read and display the map at that time, the navigation device enables the user to check the conditions of the sub-route 2 from the display unit 21 in advance before the travel speed assigned to the sub-route varies.

Further, the control unit 25 stores the time and position information at the time that the moving object starts travelling in the movement history information storage unit 27. After the moving object has started travelling, the control unit stores the passage times of the start point, the end point, and the waypoints of each sub-route in the movement history information storage unit 27. The historical data stored in the movement history information storage unit 27 can be written into a storage medium as searched route data to which the movement history is added while being associated with the passage times of the start point, the end point, and the waypoints of each sub-route stored in the movement history information storage unit 27. As a result, even if the user interrupts his or her trip on his or her way along the route-to-be-travelled, the navigation device can keep the histories of up to the point on the route where the user has interrupted his or her trip. The user can also transport the storage medium into which the historical data are written to a navigation device mounted in another vehicle to continue his or her trip.

In the above-mentioned example, although the case in which a map of an area including the start point, the end point, and all the waypoints of each sub-route is displayed as a map of the sub-route is shown, there can be a case in which the number of routes which are searched for by the route searching unit 12 of the map data creating device is not one, and the navigation device provides either an alternative route or a second candidate for the route for the user. Further, there can be a case in which after the user starts his or her trip, a section of the route along which the user has scheduled to travel is closed due to an accident or a sudden traffic restriction.

Figure 8:
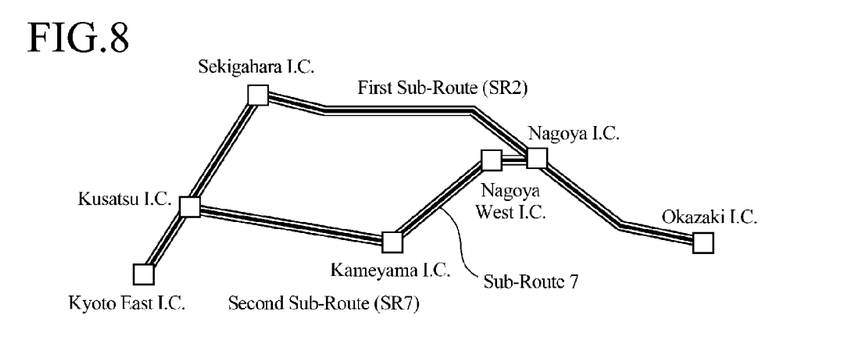
FIG. 8 is a view showing an example of a map displayed by the map data creating device in accordance with Embodiment 1 of the present invention, and including, in addition to a first sub-route selected by a user, a second sub-route.

FIG. 8 shows an example of a map including a second sub-route in addition to a first sub-route selected by the user. In FIG. 8, the first sub-route shows the sub-route 2 (SR2) which is selected by the user and which leads from the Okazaki I.C. to the Kyoto East I.C. The second sub-route (SR7) is the one leading from the Nagoya I.C., via another path, to the Kyoto East I.C. The second sub-route (SR7) is the one leading from the Nagoya I.C., through the Higashimeihan expressway, the Kameyama I.C., the Shin-Meishin expressway, the Kusatsu I.C., and the Meishin expressway, to the Kyoto East I.C. The travel speed assigned to the sub-route is 65 km/h and the map scale assigned to the sub-route is 1/10,000.

By also including a map of the second sub-route having a scale according to the travel speed in the searched route data in this way, the navigation device can provide guidance about the route even in a case in which the first sub-route becomes impassable.

Next, a process of connecting between two sub-routes will be explained. At a connection point at which one sub-route is connected with another sub-route, the travel speed assigned varies while the map scale assigned varies. Because the scale of the map displayed on the display unit 21 of the navigation device varies when the moving object crosses the boundary between two sub-routes which is a connection point at which one of them is connected with the other sub-route, there is a case in which the user cannot easily realize information about the surroundings of the connection point. Therefore, particularly when the moving object is getting close to an entrance or exit of an expressway, a display of a map of an area including branches of the entrance or exit is convenient for the user.

Figure 9:
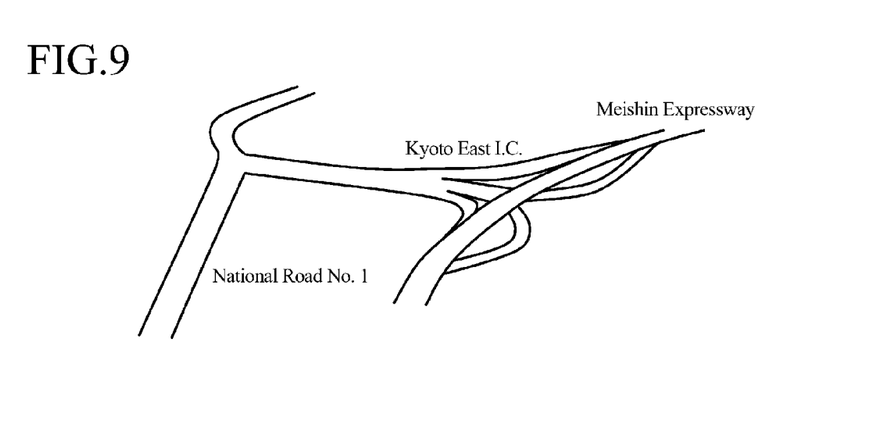
FIG. 9 is a view showing in detail a map, which is displayed by the map data creating device in accordance with Embodiment 1 of the present invention, of an area surrounding a connection point where a sub-route 2 and a sub-route 3 are connected with each other.

FIG. 9 is a view showing in detail a map of an area surrounding the Kyoto East I.C. which is the connection point at which the sub-route 2 (SR2) is connected with the sub-route 3 (SR3), and the scale of the map is 1/2,500. The user can see from this map that when going to the JR Kyoto Station, the user should travel along the leftmost lane of the down line of the Meishin Expressway and exit the Meishin Expressway from the Kyoto East I.C., and then travel along the down line of the National Road No. 1. The user's convenience can be improved by displaying a connection point at which one sub-route is connected with another sub-route with a more detailed map having a third scale.

The above-mentioned displaying method can be applied not only when using only a vehicle as the means of transportation, but when changing from a vehicle to another means of transportation, such as a railroad, and the user's convenience can be improved by including a detailed map of an area surrounding a station at which the user changes from a vehicle to a railroad, and a detailed map of the station yard in the data about the sub-route.

Next, an example in which a plurality of searched route data are stored will be explained. By storing searched route data while bringing a travel speed into correspondence with a scale of map data, the data volume of the searched route data stored can be reduced, and not only single searched route data but also searched route data respectively corresponding to a plurality of users can be stored.

FIG. 10 shows input information about an itinerary which a user A desires, input information about an itinerary which a user B who is a coworker of the user A desires, and searched routes. The two leftmost columns of FIG. 10 show the input information A about the itinerary which the user A desires and the input information B about the itinerary which the user B desires. Two columns of FIG. 10 on the right of the two leftmost columns show searched routes which are searched for by the map data creating device (map server): a searched route A for the user A and a searched route B for the user B. The rightmost column shows a relationship between the searched route A and the searched route B.

The user A desires to move from Tokyo to Kobe by car while the user B desires to depart from the Tokyo Station at 13:00 and move to the Takamatsu harbor via the Meriken Park in Kobe city after meeting the user A at the Kyoto Station. The navigation device searches for a route according to the input information A to acquire the searched route A which matches the user A's desire. The searched route A is divided into six routes from a sub-route (SR1) to a sub-route (SR6) according to their respective travel speeds, and is stored together with maps each having a scale corresponding to a travel speed assigned to a corresponding sub-route.

On the other hand, the navigation device searches for a route according to the input information B to acquire the searched route B which matches the user B's desire. Along a sub-route (SR1) of the searched route B, the user departs from the Tokyo Station by the 13:10 Shinkansen Nozomi train, and arrives at the Kyoto Station at 15:28. After that, the user departs from the Kyoto Station at 16:00 by car along the sub-route (SR2), and arrives at the Meriken Park in Kobe city before 19:00 through the sub-routes (SR3) and (SR4). Then, the user moves to Takamatsu by ferry along the sub-route (SR5). Arrival at the Takamatsu harbor is at 5:00 in the next morning. That is, the searched route enables the user to arrive at the Takamatsu harbor before 6:00 at which time the user B desires to arrive at this harbor.

Figure 11:
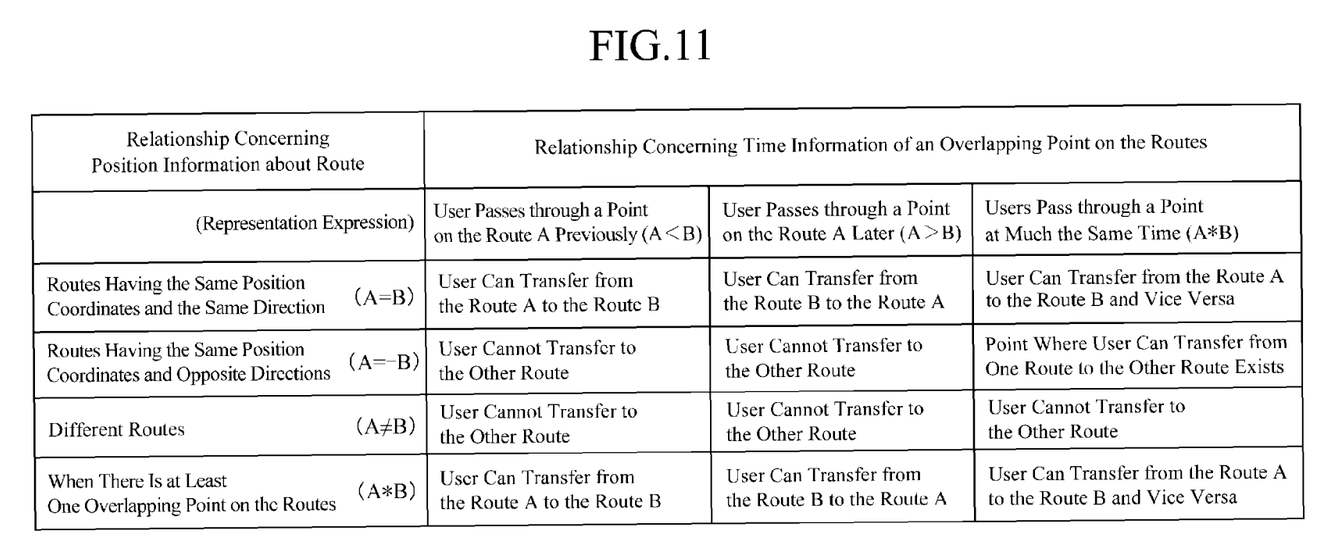
FIG. 11 is a view showing a relationship between two routes created by the map data creating device in accordance with Embodiment 1 of the present invention.

FIG. 11 is a view showing a relationship between two routes, and shows whether a user can transfer from one of the two routes to the other route according to the position of a point on the routes and the time that the user passes through the point. Referring to FIG. 11, in a case in which the start point, the end point, and the waypoints of the route A are the same as those of the route B, that is, the position coordinates of the route A are the same as those of the route B, and the two routes are extending in the same direction, the routes are shown by A=B. In a case in which the position coordinates of the route A are the same as those of the route B, but the start point and the end point of the route A are inverse to those of the route B, that is, the two routes are extending in opposite directions, the routes are shown by A=−B. In a case in which there is no point overlapping between the route A and the route B, the routes are shown by A≠B, whereas in a case in which there is at least a point having the same position coordinates and overlapping between the route A and the route B, the routes are shown by A*B.

In a case in which the routes are shown by A=B, and the user of the route A passes through a point on the route A before the user of the route B passes through the point, the user of the route A can delay his or her schedule and wait for the means of transportation for the route B to transfer to the route B. In contrast with this, the user of the route B cannot transfer from the route B via which the user of the route B arrives at the point after the user A's arrival at this point to the route A via which the user of the route A arrives at the point before the user B's arrival at this point. If the routes A and B enable the users to arrive at the point at the same time, a transfer from the route A to the route B or a transfer from the route B to the route A can be performed. In a case in which there is a point having the same position coordinates and overlapping between the route A and the route B, the user of the route A can make a change from the route A to the route B when the user passes through the point before the user of the route passes through the point. In a case in which the user of the route A and the user of the route B arrive at an overlapping point simultaneously, the user of the route A can perform a transfer from the route A to the route B and the user of the route B can perform a transfer from the route B to the route A. A relationship among a plurality of routes can be described by the expressions as shown in FIG. 11.

Because the sub-route (SR4) of the searched route A and the sub-route (SR2) of the searched route B, which are shown in FIG. 10, has a relationship of SR4=SR2, and the sub-route (SR2) of the searched route B enables the user of the route B to arrive at the endpoint before the user of the route A arrives at the end point, the user of the route B can transfer from the sub-route (SR2) of the searched route B to the sub-route (SR4) of the searched route A. Similarly, the following relationships: the sub-route (SR5) of the searched route A=the sub-route (SR3) of the searched route B, and the sub-route (SR6) of the searched route A=the sub-route (SR4) of searched route B are established. Therefore, the user B can transfer to the user A's car to ride together with the user A towards Kobe.

Hereafter, an example in which the user B stores the searched route data shown in FIG. 10 in an IC card, and then moves will be explained. The user B stores the departure time and the place of departure in the IC card when departing from a company in the vicinity of the Tokyo Station. Further, equipment for reading and writing data from and into the IC card can be installed in each ticket gate disposed in each station yard of railroad companies. The user B gets aboard the 13:10 Shinkansen Nozomi train according to the searched route data written in the IC card, and then arrives at the JR Kyoto Station via the Shin-yokohama Station and the Nagoya Station. At this time, when the user B is bringing a portable navigation device having the same structure as that shown in FIG. 7, he or she can recognize the current position visually by causing the navigation device to display the current position detected by the current position detecting unit 22 on the display unit 21.

The user B gets off the train at the JR Kyoto Station, and waits for the user A's arrival. When the car of the user A arrives at the JR Kyoto Station, the user B inserts the IC card into the storage medium input output unit 28 of the navigation device mounted in the car of the user A. Then, the control unit 25 reads the searched route data of the user B, and stores this searched route data in the searched route data storage unit 24. In this case, by including the mail address of the user in the searched route data, the navigation device can identify the user of the searched route data. Because the user B can transfer to the car of the user A, as mentioned above, the current position and time of the car of the user A which is stopped at the JR Kyoto Station are stored in the user B's movement history. The user B who rides together with the user A then travels with the user A.

Because the sub-routes (SR2) to (SR4) of the searched route B are the same as the sub-routes (SR4) to (SR6) of the user A, respectively, the movement history of the user A is the same as that of the user B, and the movement history about the user A's movements by car using the searched route data of the user A is stored in the sub-route of the user A while the same movement history is also stored in the sub-route of the user B. Therefore, when the navigation device has a movement history about movements associated with route guidance which the navigation device has provided for the user using the single searched route data, the navigation device can also leave the same movement history in the searched route data of the user B who is carrying only his or her searched route data and is a fellow passenger. The user B arrives at the Meriken Park in Kobe city in this way.

As mentioned above, when there are a plurality of routes which different users use, the map data creating device divides each of the routes into sub-routes, and determines a relationship between the sub-routes of the plurality of routes on the basis of position information and time information of each of the sub-routes and stores the relationship. Therefore, the map data creating device can determine whether or not a transfer from one of the routes to another route can be performed, and can contribute to improvements in the convenience of travelling. Further, because the searched route of the user A is accompanied by the user A's e-mail address, the user can be identified. Therefore, there is provided an advantage of enabling the users to transmit and receive their searched route data to and from each other by using a communication means such as an e-mail.

Although an interchange of an expressway is explained above as an example of a connection point where a sub-route is connected with another sub-route, in a case in which a user moves by train, a detailed map for change and/or a view of a station yard showing a route leading to a nearby station which is the closest to his or her destination can be used as searched route data while being brought into correspondence with a sub-route.

Further, although an example of determination of whether a user can transfer from one route to another route according to a relationship between sub-routes is shown in FIG. 10, the map data creating device can be constructed in such a way as to add, as data, a relationship showing whether or not high-speed communications, such as WiMAX (Worldwide Interoperability for Microwave Access), can be carried out between moving objects. Further, in a case in which a high speed communication infrastructure is upgraded, a communicable area from the distance between each installed position of a high-speed communication network and a network, such as roads and railroads, can be determined, and communicable sections can be inputted as data in advance together with the network, such as roads and railroads, for use in the map data creating device. In this case, when sub-routes are specified, the map data creating device can determine whether both of the sub-routes are located in a communicable section, and, when both of the sub-routes are located in a communicable section, additionally writes information showing that a relationship between the sub-routes is communicable into the data, so that the map data creating device can show whether or not communications can be carried out between the sub-routes with a display or the like.

As previously explained, because the map data creating device in accordance with Embodiment 1 of the present invention is constructed in such a way as to store a travel speed at which a moving object is expected to travel along a route and a map scale while bringing them into correspondence with each other, the map data creating device provides map data about a map having a large scale for the user when the user is driving along an expressway or the like where the travel speed is high and a long distance can be traveled in a short time, and the user needs map data about a wide area, and, when the user is driving along a general road where the travel speed is slow or walking along a road, can provide map data about a map having a large scale and showing intersections, buildings or the like in a small area along the road in detail for the user. As a result, the amount of map data which the map data creating device stores while acquiring information suitable for the route-to-be-travelled can be reduced.

Particularly, when carrying a portable storage medium in which predetermined searched route data about a planned trip and map data about an area along the route are stored as a set, the user can store a plurality of searched route data in the storage medium. Further, there is an advantage of being able to reduce the amount of transmission data when a server transmits searched route data to a terminal and when searched route data are transmitted and received between terminals. Therefore, even in a case in which maps for unsophisticated navigation are prepared in a portable navigation device, by inputting searched route data created by the map data creating device in accordance with Embodiment 1 of the present invention in the portable navigation device, the portable navigation device is enabled to read detailed map information according to a section where the user of the portable navigation device is moving, and can provide route guidance for the user.

Industrial Applicability

The present invention can be used for a portable navigation device, a car navigation device, and so on.

The invention claimed is:
1. A map data creating device comprising:
a map database for storing map data;

a route searching unit for searching for a prospective travel route comprising a plurality of links, the prospective travel route leading from a place of departure to a destination and being described by searched route data;

an average travel speed calculating unit for calculating an average travel speed for each link included in the searched route data based on information which is included in the map data acquired from said map database and which is assigned to a corresponding link;

a control unit for dividing the prospective travel route which is searched for by said route searching unit into sub-routes according to the average travel speeds calculated by said average travel speed calculating unit to acquire map data about maps for the respective sub-routes from said map database, the scale of each of said maps being determined according to one of the calculated average travel speeds associated with the corresponding sub-route; and a searched route data storage unit for storing the map data acquired by said control unit while bringing the map data into correspondence with said each of the sub-routes.

2. The map data creating device according to claim 1, wherein the searched route data storage unit stores map data about a map of an area including a start point, an end point, and all waypoints of each of the sub-routes as the map data associated with said each of the sub-routes.

3. The map data creating device according to claim 1, wherein the route searching unit searches for a plurality of routes from the place of departure to the destination, the average travel speed calculating unit calculates an average travel speed for each link included in searched route data showing each of the plurality of routes which are searched for by said route searching unit based on information which is included in the map data acquired from the map database and which is assigned to a corresponding link, the control unit divides each of the plurality of routes which are searched for by said route searching unit into sub-routes according to the average travel speeds calculated by said average travel speed calculating unit to acquire map data about maps for the respective sub-routes from said map database, the scale of each of said maps being determined according to one of the calculated average travel speeds associated with the corresponding sub-route, and the searched route data storage unit stores map data about a map of an area including all of a start point, an end point, and waypoints of each of the sub-routes of each of the plurality of routes which are searched for by said route searching unit as map data associated with said each of the sub-routes.

4. The map data creating device according to claim 1, wherein the control unit divides the route which is searched for by the route searching unit into sub-routes according to the average travel speeds calculated by the average travel speed calculating unit, and acquires from the map database map data about a map including a connection point at which two contiguous sub-routes are connected with each other, the map having a scale different from scales according to average travel speeds for the two contiguous sub-routes acquired through said division.

5. The map data creating device according to claim 1, wherein said map data creating device includes a display unit for outputting information, the route searching unit searches for a plurality of routes, the average travel speed calculating unit calculates an average travel speed for each link included in the searched route data showing each of the plurality of routes which are searched for by said route searching unit based on information which is included in the map data acquired from the map database and which is assigned to a corresponding link, the control unit divides each of the plurality of routes which are searched for by said route searching unit into sub-routes according to the average travel speeds calculated by said average travel speed calculating unit to acquire map data about maps for the respective sub-routes from said map database, the scale of each of said maps being determined according to one of the calculated average travel speeds associated with the corresponding sub-route, the searched route data storage unit stores map data about a map of an area including all of a start point, an end point, and waypoints of each of the sub-routes of each of the plurality of routes which are searched for by said route searching unit as map data associated with said each of the sub-routes, and said display unit outputs information enabling determination of whether or not a transfer between sub-routes of the plurality of routes can be performed.

6. A navigation device comprising:
a current position detecting unit for detecting a current position and a current travel speed;
an external data acquiring unit for acquiring searched route data showing a prospective travel route which is searched for and which is divided into a plurality of sub-routes according to average travel speeds calculated for each link included in the prospective travel route based on information included in an external database, and map data about maps corresponding respectively to said plurality of sub-routes, the scale of each of said maps being determined according to one of the calculated average travel speeds associated with the corresponding sub-route; and
a control unit for performing a process of displaying from said acquired map data the map corresponding to a particular one of said plurality of sub-routes in which said detected current position is located, to guide a user along said searched route.

7. A map processing system comprising:
a map data creating device; and
a navigation device,
wherein said map data creating device includes:
a map database for storing map data;
a route searching unit for searching for a prospective travel route comprising a plurality of links, the prospective travel route leading from a place of departure to a destination and being described by said searched route data;
an average travel speed calculating unit for calculating an average travel speed for each link included in the searched route data based on information which is included in the map data acquired from said map database and which is assigned to a corresponding link;
a control unit for dividing the prospective travel route which is searched for by said route searching unit into sub-routes according to the average travel speeds calculated by said average travel speed calculating unit to acquire map data about maps for the respective sub-routes from said map database, the scale of each of said maps being determined according to one of the calculated average travel speeds associated with the corresponding sub-route;
a searched route data storage unit for storing the map data acquired by said control unit while bringing the map data into correspondence with said each of the sub-routes; and an output unit for outputting data stored in said searched route data storage unit, and wherein said navigation device includes:

a current position detecting unit for detecting a current position and a current travel speed;

an external data acquiring unit for acquiring said searched route data outputted from the output unit of said map data creating device and map data; and a control unit for performing a process of displaying a map having a scale corresponding to said current position and said current travel speed according to said searched route data and said map data to guide a user along said searched prospective travel route.

* * * * *